United States Patent [19]

Polyak

[11] 4,122,675

[45] Oct. 31, 1978

[54] SOLAR HEAT SUPPLEMENTED CONVECTION AIR STACK WITH TURBINE BLADES

[76] Inventor: Jack Polyak, 1015 Kelly Ave., Joliet, Ill. 60435

[21] Appl. No.: 778,784

[22] Filed: Mar. 17, 1977

[51] Int. Cl.² .......................... F02C 1/02; F03G 7/00
[52] U.S. Cl. ........................................ 60/398; 60/641; 52/173 R
[58] Field of Search ................ 60/641, 650, 682, 398; 52/173

[56] References Cited

U.S. PATENT DOCUMENTS

| | | | |
|---|---|---|---|
| 1,274,478 | 8/1918 | Webb | 60/698 |
| 4,004,427 | 1/1977 | Butler, Jr. | 60/698 |

*Primary Examiner*—Allen M. Ostrager

*Attorney, Agent, or Firm*—Clarence A. O'Brien; Harvey B. Jacobson

[57] ABSTRACT

A high rise building is provided including upstanding peripheral wall portions and at least one of the peripheral wall portions includes an upstanding air flow passage extending therealong. Horizontally outwardly projecting and downwardly opening hollow snout-like shrouds define air inlets opening outwardly and downwardly along the one upstanding peripheral wall portion and inwardly into the air flow passage at points spaced vertically therealong. A rotary turbine including an inlet and outlet is supported from an upper portion of the building and the upper end portion of the air flow passage is communicated with the inlet of the turbine. The turbine includes a rotary output shaft and a generator is driven from the rotary output shaft of the turbine for generating electrical current.

9 Claims, 11 Drawing Figures

SOLAR HEAT SUPPLEMENTED CONVECTION AIR STACK WITH TURBINE BLADES

BACKGROUND OF THE INVENTION

Various forms of vertical passages associated with tall buildings and designed to allow convection air flow upwardly therethrough have been heretofore provided and the upper ends of the air passages have been associated with air turbine structures for driving electric generators.

However, most of these forms of buildings have been constructed in a manner requiring a specific design of building conforming to the basic air passage structure associated therewith and few have included means whereby wind incident upon the building may also be used to drive turbines. Accordingly, a building structure of generally conventional design having vertical air flow passages therein operatively associated with air turbine structure at their upper ends and with the air passages positioned on the building in a manner such that vertically spaced portions of the air passages may have outwardly opening inlets provided therefor to receive wind air incident upon the building is desirable.

Examples of previously known forms of buildings equipped with vertical air passages and turbine structure operatively associated with the upper outlet ends of the air passages as well as other structures including some of the basic structural and operational features of the instant invention are disclosed in U.S. Pat. Nos. 401,516, 757,800, 758,226, 918,364, 1,112,203, 2,277,311, 2,371,629, 3,137,125, 3,436,908, 3,514,942, 3,800,686 and 3,822,692.

BRIEF DESCRIPTION OF THE INVENTION

The building of the instant invention is of the high rise type and is basically conventional in design. Vertically air disposed air passage defining structure is supported from the outer surfaces of the walls of the building and the lower ends of the vertical air passages as well as points spaced vertically therealong are provided with air inlet openings adapted to intake wind air incident upon the associated building wall. The upper ends of the vertical air passages are ducted to the inlet of a cross flow turbine drivingly coupled to a generator. Accordingly, convection air currents flowing upwardly through the air passages as well as wind air incident upon the corresponding walls of the building flow upwardly through the air passages and drive the cross flow turbine which in turn drives the associated generator to provide a source of electrical power to be used in the building.

The main object of this invention is to provide a building structure including vertically extending air passages supported therefrom and operative to duct convection air upwardly therethrough as well as air incident upon the corresponding sides of the building upon which the air passages are mounted.

Another object of this invention is to provide turbine structure to which the air discharging from the upper ends of the air passages is ducted for driving the turbine structure.

Yet another important object of this invention, in accordance with the immediately preceding objects, is to provide rotary electric generating structure to which the turbine is drivingly connected whereby the convection and wind air passing upwardly through the air passages may be harnessed to provide electrical current for the building.

A further object of this invention is to provide a structure in accordance with the preceding objects and constructed in a manner whereby radiant heat from the sun incident upon the vertical air passage defining structure will enhance the upward passage of convection air through the air passages.

Still another object of this invention is to provide a turbine structure of the cross flow type whereby considerable efficiency in harnessing the energy represented by upwardly moving air through the air passages may be achieved.

A final object of this invention to be specifically enumerated herein is to provide an apparatus in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENT

Figure 1:
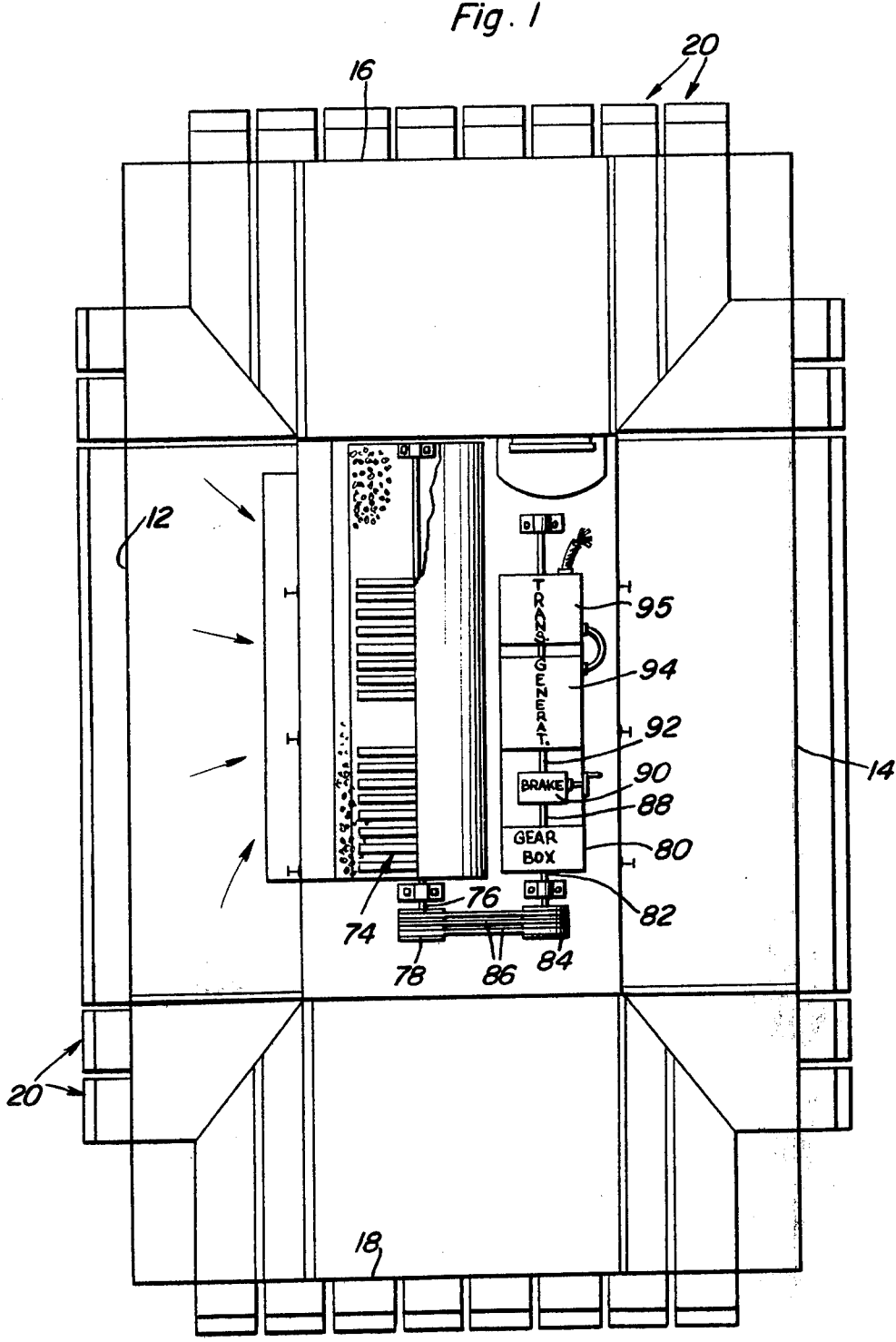
FIG. 1 is a top plan, schematic view of a building constructed in accordance with the present invention and with the upper cover portion of the turbine and ducted air exhausting structure removed.

Referring now more specifically to the drawings, the numeral 10 generally designates a building constructed in accordance with the present invention. The building 10 includes upstanding opposite side walls 12 and 14 as well as opposite end walls 16 and 18. Each of the walls 12, 14, 16 and 18 has a plurality of horizontally spaced duct structures referred to in general by the reference numeral 20 mounted on the exterior thereof and extending vertically therealong.

Figure 5:
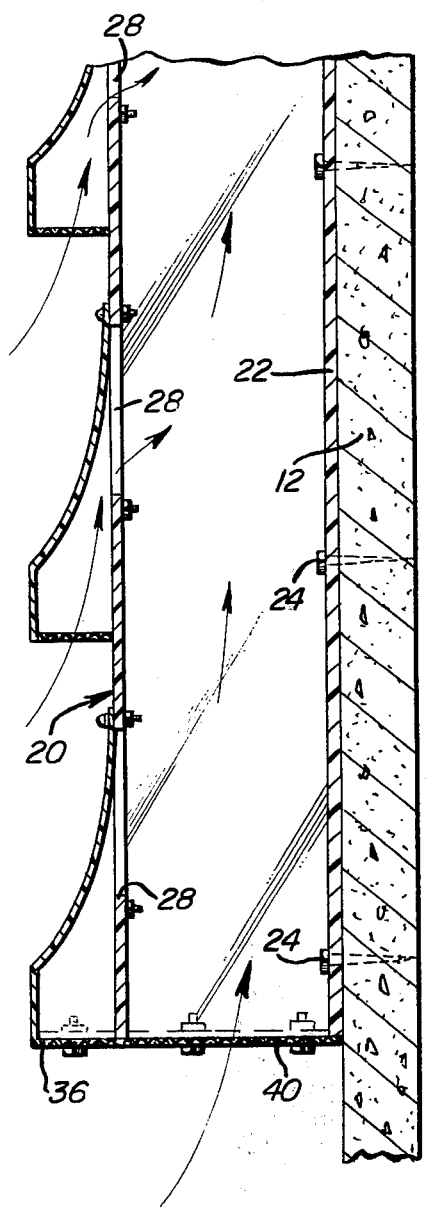
FIG. 5 is an enlarged, vertical sectional view taken substantially upon the plane indicated by the section line 5—5 of FIG. 3.

Each of the duct structures includes an inner vertical plate 22 extending along and secured over the outer surface of the corresponding wall, such as the wall 12 in FIG. 5. The plate 22 is secured to the wall 12 by means of suitable anchor bolts 24 spaced along the opposite side marginal portions thereof. In addition, each duct structure 20 includes a vertically extending inwardly opening channel-shaped duct bodies 26 secured over the outer surface of the correspoding plate 22 by means of the bolts 24 and each duct body 26 includes a plurality of vertically spaced openings 28 formed in its outer wall 30. Horizontally outwardly projecting and downwardly opening snout-shaped shrouds 32 are secured to the outer surface of the wall 30 by means fasteners 34 and the lower open end of each shroud 32 is closed by means of a screen assembly 36 secured thereto by means of fasteners 38. It may also be seen from FIG. 2 of the drawings that the lower ends ends of the duct structures 20 are open and covered by screens 40.

The shrouds 32 are constructed of transparent plastic and the plates 22 may be coated with a heat absorbing black coating. In addition, each of the duct bodies 26 is constructed of transparent plastic. Accordingly, radiant heat from the sun incident upon the duct structures 20 will pass through the shrouds 32 and the duct bodies 26 and heat the plates 22 whereby air will flow upwardly through the duct structures 20 by convection.

The upper portion of the building 10 includes slanted roof sections 42 and the center of the roof includes an upwardly projecting cupola structure referred to in general by the reference numeral 44. the cupola structure 44 includes corrugated transparent or at least translucent side panels 46 secured to suitable supporting I-beams 48 by means of fasteners 50 and the roof sections 42 are transparent and spaced above generally paralleling panels 52 defining duct passages 54 into which the upper ends of the duct structures 20 open and which turn open into an upper plenum 56 disposed immediately below the cupola 46 and opening upwardly into the latter through a screened inlet opening 58, the panels 52 have blackened panels 60 supported thereform whereby radiant energy from the sun incident thereon will cause the panels 52 to be heated and thereby additionally facilitate convection air flow upwardly through the duct structures 20.

A cross flow turbine structure referred to in general by the reference numeral 62 is mounted within the cupola 46 and the inlet opening 58 comprises the inlet for the turbine structure 62, the latter including an outlet opening 64 opening into a hollow cap structure 66 supported from the upper portion of the cupola 46 and defining a horizontal cross flow passage 68 therethrough including opposite side inlet and outlet openings 70 and 72.

The turbine structure 62 includes a horizontally disposed journaled turbine rotor referred to in general by the reference numeral 74 and including an output shaft 76 having a pulley wheel 78 mounted thereon. A speed change gear transmission 80 is supported within the cupola 44 and includes an input shaft 82 upon which a pulley wheel 84 is mounted. The pulley wheel 78 is drivingly coupled to the pulley wheel 84 by means of a plurality of endless flexible belts 86 trained about the pulleys 78 and 84 and the speed change gear transmission 80 includes a rotary output shaft 88 having a manually operable brake 90 operatively associated therewith and drivingly coupled to the input shaft 92 of a generator 94. The generator 94 supplies current to a transformer 95 and the transformer 95 may therefore be utilized to supply current of the proper voltage to the building electrical system.

The speed change gear transmission 80 drives the generator 94 at a rotational speed considerably greater than the rotational speed of the rotor 74 and the cross flow turbine structure 62 intakes air from the inlet opening 58 and exhausts air into the cross flow cap structure 66 through the outlet opening 64.

Figure 8:
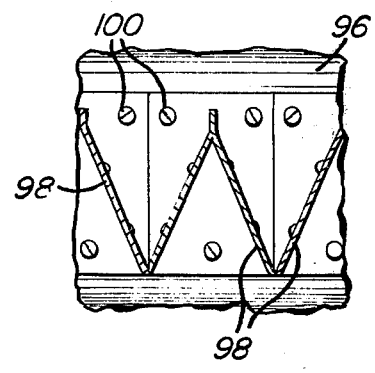
FIG. 8 is a fragmentary, longitudinal, vertical sectional view of one portion of one of the longitudinal rows of blades of the turbine.
Figure 9:
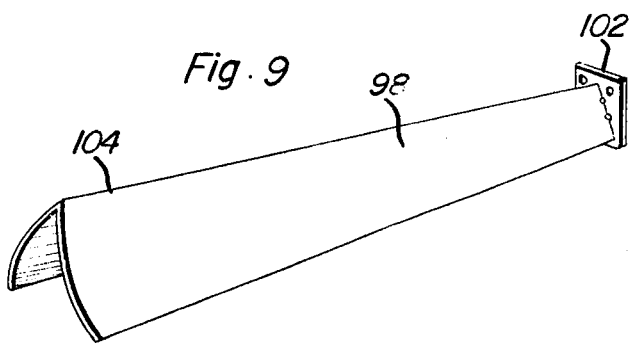
FIG. 9 is a perspective view of one of the tubine blades.

The rotor 74 of the turbine structure 62 includes a central shaft structure of octagonal cross-sectional shape and designated by the reference numeral 96. Each of the sides of the shaft structure 96 has a row of elongated generally radial blades 98 mounted thereon by means of suitable fasteners 100 secured through mounting plate portions 102 carried by the base ends of the baldes 98 and each of the blades 98 is generally V-shaped in cross section. The apex portions 104 of the blades 98 face in a clockwise direction about the rotor 74 as viewed in FIG. 1 of the drawings and the blades 98 mounted on each side of the shaft structure 96 are disposed in side-by-side abutting engagement, see FIG. 8. Accordingly, the blades 98 trap the air flowing upwardly into the cupola 46 through the inlet opening 58 of the turbine structure 62 and cause the latter to rotate in a clockwise direction as viewed in FIG. 2 of the drawings, the air being exhausted upwardly through the outlet opening 64 into the cross flow cap structure 66.

Figure 2:
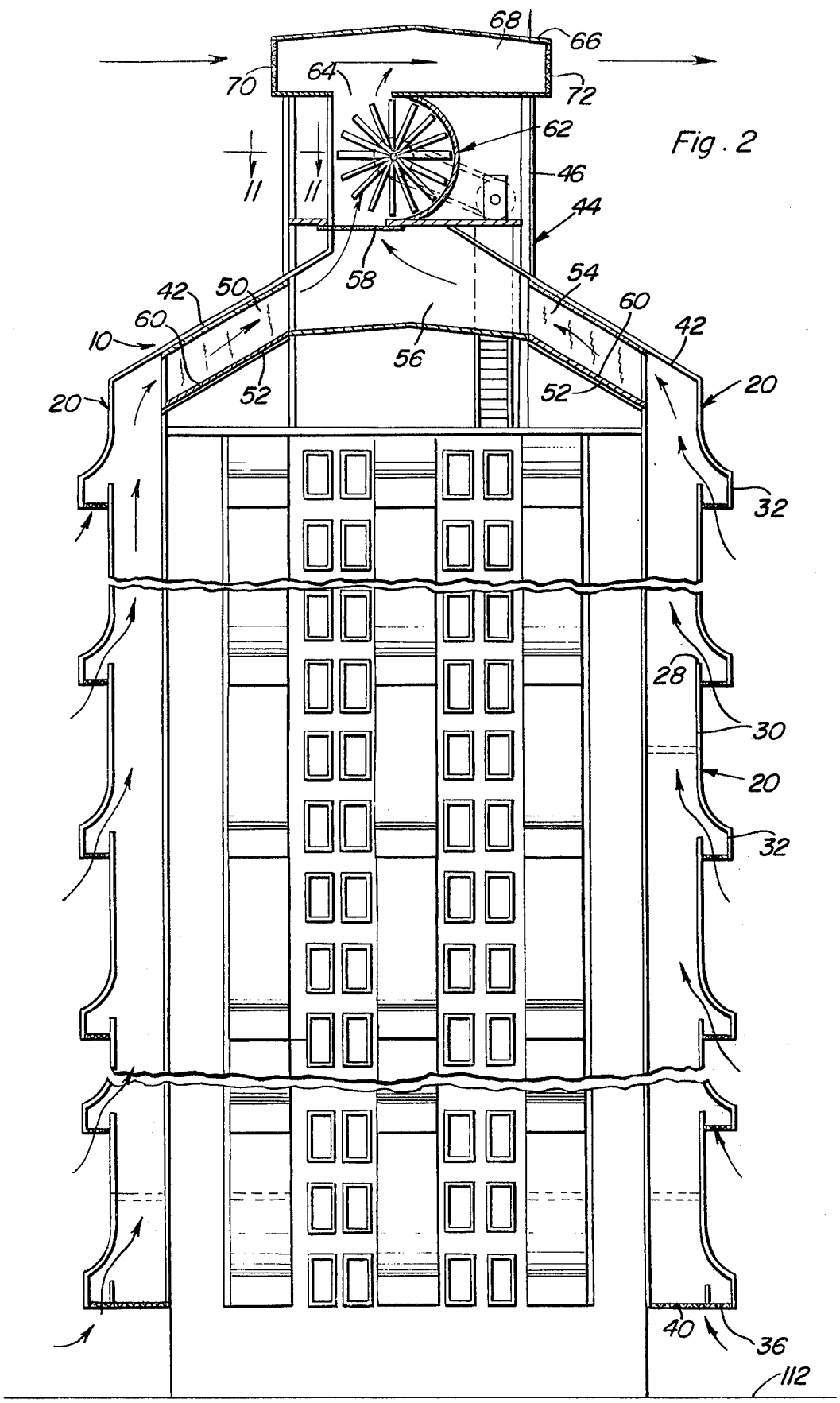
FIG. 2 is a fragmentary, transverse, vertical sectional view of the building structure with vertically spaced portions of the building broken away.
Figure 3:
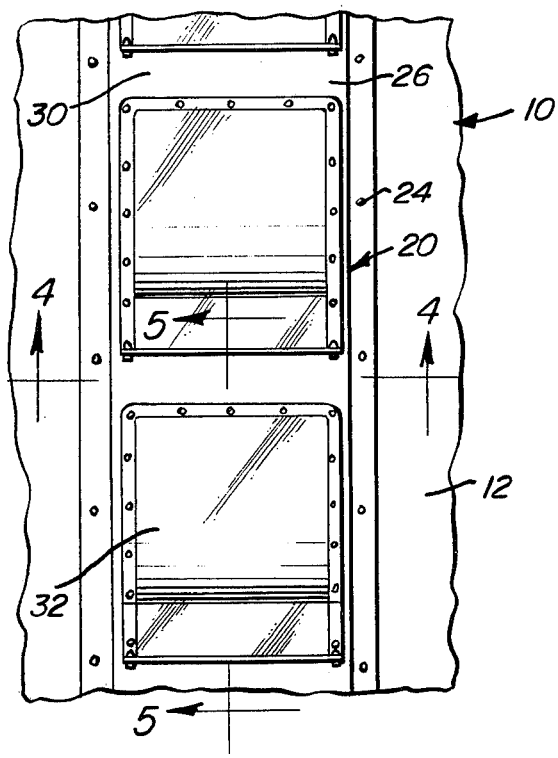
FIG. 3 is a fragmentary, side elevational view of one side wall of the building and illustrating the portions of the associated air ducting structure supported therefrom.
Figure 4:
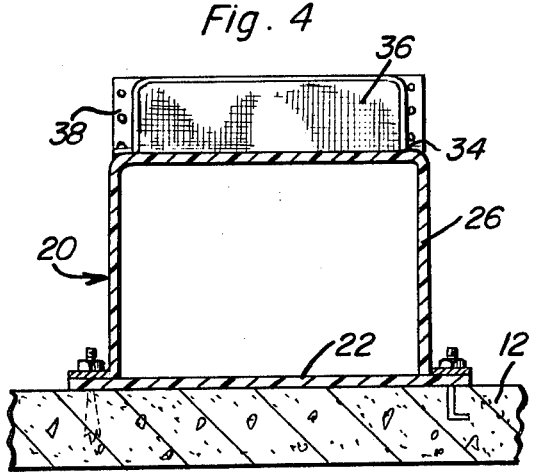
FIG. 4 is a horizontal, sectional view taken substantially upon the plane indicated by the section line 4—4 of FIG. 3.
Figure 10:
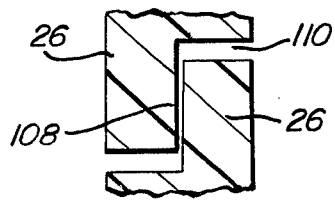
FIG. 10 is an enlarged vertical sectional view illustrating the horizontal joint betwen adjacent upper and lower duct bodies.
Figure 11:
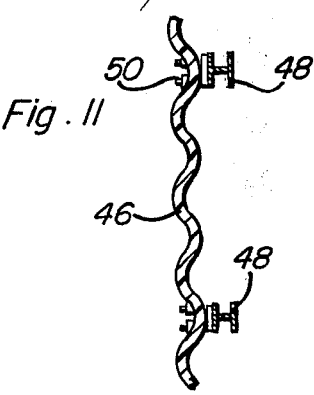
FIG. 11 is an enlarged horizontal sectional view taken substantially upon the plane indicated by the section line 11—11 of FIG. 2.
Figure 6:
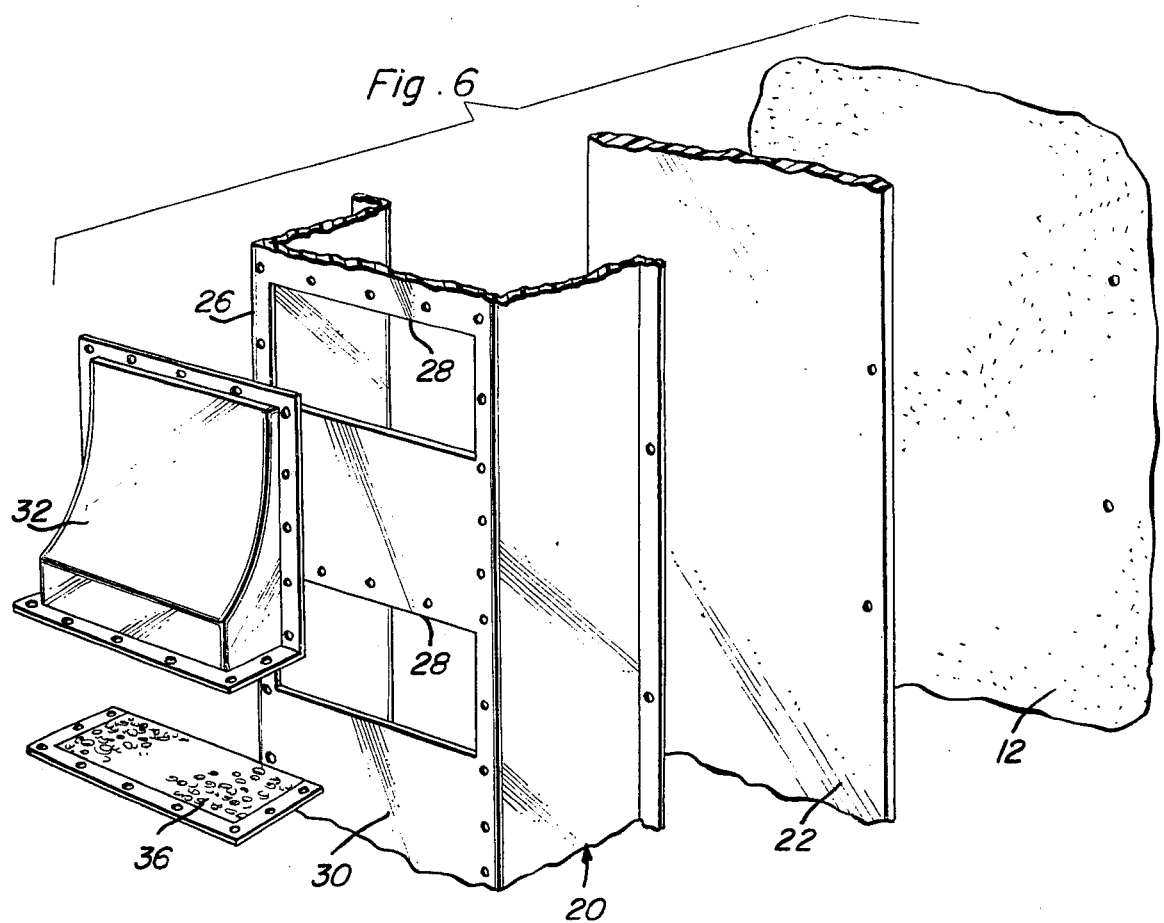
FIG. 6 is a fragmentary, exploded, perspective view of a vertical mid portion of one of the air duct structures.
Figure 7:
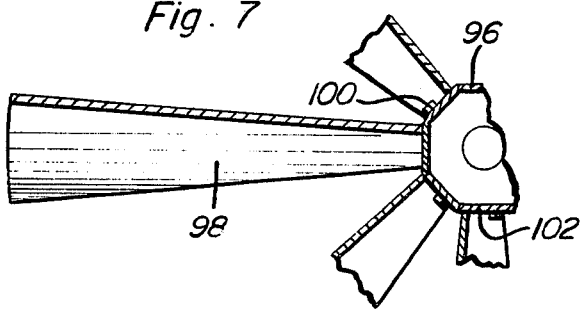
FIG. 7 is a fragmentary, transverse, vertical sectional view of a section of the turbine on somewhat of an enlarged scale.

With attention now invited more specifically to FIGS. 2 and 4 of the drawings, it may be seen that the duct structures 20 each include vertically aligned duct bodies 26. The duct bodies 26 are overlapped in the manner illustrated in FIG. 10 of the drawings with a small horizontal clearance 108 disposed between adjacent duct bodies 26 and somewhat greater vertical clearance 110 disposed between overlapping adjacent portions of the duct bodies 26. The overlapping construction and clearances 108 and 110 illustrated in FIG. 10 allow for expansion and constraction of the duct bodies 26.

The shrouds 32 may be spaced apart as desired according to the average wind which will be incident upon the building 10 and the duct bodies 26 are substantially 10 feet in vertical extent. Accordingly, an expansion joint between adjacent duct bodies 26, such as that illustrated in FIG. 10 of the drawings, occurs approximately every 10 feet along the vertical extent of the building 10 to the upper ends of the duct structures 20. The lower ends of the duct structures 20 are spaced above the ground 112.

The duct structures may be disposed in side-by-side relation compietely across an entire wall of the building 10 if that wall does not include window openings. However, if the wall is provided with horizontally spaced tiers of vertically spaced window openings, the duct structures 20 are disposed between adjacent tiers of windows. If the spacing between adjacent tiers of windows is sufficient, two, three, or more, duct structures may be disposed in side-by-side relation between adjacent tiers of vertically spaced windows. Furthermore the duct structures are constructed in generally 10 foot lengths and the overlapping duct structure joint illustrated in FIG. 10 of the drawings is provided between adjacent duct body ends in order to compensate for expansion of the duct bodies 26.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a high rise building of the type including upstanding peripheral side walls, at least one of said side walls including horizontally spaced apart vertical tiers of vertically spaced windows, at least one duct means having a vertical outer wall, said duct means extending along, supported from and projecting outwardly of said one side wall between a pair of adjacent tiers of windows, said outer wall including vertically spaced horizontally outwardly projecting and downwardly opening snout-shaped shrouds opening in upwardly inclined directions into said duct means, and rotary turbine means supported from an upper portion of said building including an air inlet and an air outlet, the upper end portion of said duct means being communicated with said rotary turbine means inlet.

2. The combination of claim 1 including additional duct means, corresponding to the first mentioned duct means supported from and projecting outwardly of said one side wall and extending along the remote sides of said tiers of vertically spaced windows, said additional duct means also including vertically spaced horizontally outwardly projecting and downwardly opening snout-shaped shrouds opening in upwardly inclined directions into said additional duct means, the upper ends of said additional duct means also being communicated with said rotary turbine means inlet.

3. The combination of claim 1 wherein said rotary turbine means includes a rotary output shaft, generator means for generating electrical current and including a rotary input shaft, drive means drivingly coupling said output shaft to said input shaft.

4. The combination of claim 3 wherein said drive means includes endless flexible drive belt means operably connecting said output shaft to said input shaft.

5. The combination of claim 1 wherein said rotary turbine means includes a cross flow rotary turbine.

6. The combination of claim 5 wherein said rotary turbine includes generally radial blades spaced about and along the axis of rotation of said turbine.

7. The combination of claim 6 wherein said blades are generally V-shaped in transverse cross section with the apex portions thereof facing in the direction of rotation of said rotary turbine.

8. The combination of claim 1 wherein said shrouds include outwardly concave radiused upper outer surfaces opening upwardly and outwardly from said wall portion, whereby wind incident thereon will be smoothly upwardly diverted along said duct means toward downwardly opening shrouds disposed thereabove.

9. The combination of claim 1 wherein said duct means includes an outer transparent wall and inner radiant heat absorbtive inner wall means.

* * * * *